Patented Mar. 6, 1951

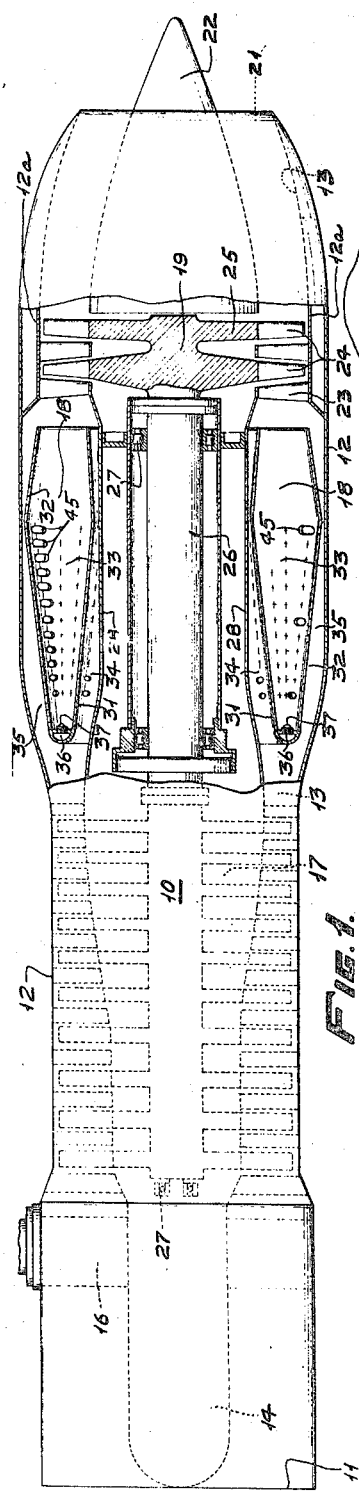

2,543,755

UNITED STATES PATENT OFFICE 2,543,755

AIR INLET OPENING ARRANGEMENT FOR COMBUSTION CHAMBERS

Ferdinand P. Berger, Collingdale, Pa., assignor to Westinghouse Electric Corporation, East Pittsburgh, Pa., a corporation of Pennsylvania Application July 25, 1946, Serial No. 686,068

1 Claim. (Cl. 60—44)

This invention relates to combustion apparatus, more particularly to combustion chamber structure, and has for an object to provide novel structure of this character.

Another object of the invention is to provide a combustion chamber wall structure having axially-extending rows of air admission openings shaped to provide maximum strength of wall structure between openings.

Yet another object of the invention is to provide, in a combustion chamber wall structure, an arrangement of air admission openings eliminating stress concentrations in the material between adjacent openings.

A further object of the invention is to provide, in a combustion chamber wall structure, rows of air admission openings whose adjacent sides are straight and parallel.

These and other objects are effected by the invention as will be apparent from the following description and claim taken in connection with the accompanying drawing, forming a part of this application, in which:

Fig. 1 is a side elevational view of a gas turbine power plant incorporating the present invention, a portion of the outer casing and part of the inner structure being broken away to better illustrate the novel features;

Fig. 2 is an enlarged fragmentary view showing the prior practice of air admission opening configuration; and, Fig. 3 is a similar view of the novel construction of the present invention.

The present invention, although not limited thereto, is particularly adapted for use with a gas turbine power plant of the type employed on aircraft to drive the propeller or an electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and the turbine for heating the compressed air and which discharges the hot gases at suitable temperature and pressure to the turbine. The gases on leaving the turbine are discharged through a nozzle provided at the rear of the casing and may aid in propelling the aircraft.

Referring now to the drawing more in detail, the power plant shown in Fig. 1 and indicated in its entirety by the reference character 10, is adapted to be mounted in or on the fuselage or wing of an aircraft with the left end or intake 11, as viewed in this figure, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial-flow compressor 17, combustion apparatus generally indicated 18, a turbine 19 which drives the compressor, and a nozzle 21 defined by the casing 12a and by a tailpiece 22, the latter being mounted concentrically in the casing and cooperating with the latter to provide the propulsion nozzle.

Air enters at the intake 11 and flows substantially straight through the plant, passing through the compressor 17, where its pressure is raised, and into the combustion apparatus 18, where it is heated. The hot gases, comprising the products of combustion and excess air heated by the combustion, on leaving the combustion apparatus are directed by suitable guide vanes or nozzles 23 against the blades 24 of the turbine disc 25 and then are discharged through the propulsion nozzle 21 to propel the aircraft.

By reference to Fig. 1, it will be seen that the compressor and turbine rotors are interconnected by means of a shaft 26 supported by suitable bearings 27 and enclosed by an inner wall structure, generally indicated 28, which protects the shaft and bearings from high temperatures and also defines a portion of the annular air flow passage 13 in which the combustion apparatus 18 is disposed.

The present invention is not limited to the specific details or arrangements of structure thus far described, but is primarily concerned with the combustion apparatus, indicated generally at 18.

A pair of frusto-conical inner and outer wall members 31 and 32, respectively, separate the annular flow passage 13, at the region of the combustion apparatus 18, into an annular burner or combustion space 33 overlapped both inwardly and outwardly by annular air spaces 34 and 35, respectively. The inner wall 31 is disposed with its base or larger end upstream and the outer wall 32 has its larger end or base downstream, with the result that the burner space 33 defined thereby increases in cross-sectional area from its upstream end to its downstream end. Conversely, the inner and outer overlapping air spaces 34 and 35, the former defined by the walls 28 and 31 and the latter by the walls 12a and 32, decrease in cross-sectional area from their upstream ends to their downstream ends.

Preferably, the upstream end of the burner space 33 is closed by an annular wall 36, in which is mounted an annular series of fuel nozzles 37 adapted to direct the fuel discharging therefrom downstream in directions substantially parallel to the longitudinal axis of the power plant.

Heretofore it has been customary to provide the inner and outer wall members 31 and 32, respectively, with straight longitudinal rows of circular openings 40 (Fig. 2) for admission of both primary and secondary air to the burner space 33 from the overlapping inner and outer air spaces 34 and 35. As a result of the circular shape of these openings, the latter are separated by narrow strips 41 of metal whose minimum widths lie along the straight line X—X (Fig. 2).

Stresses created in the wall members 31 and 32 as a result of non-uniform expansion and contraction, hot spots, and other causes, eventually result in occurrence of cracks in the narrow opening-separating strips 41, and as these cracks form at the weakest and narrowest portions of the strips, they lie along the straight line X—X, thereby producing a more serious condition than if they were staggered with respect to the line X—X.

In accordance with the present invention, the shape of the air admission openings is changed from circular to oblong, as at 45 in Fig. 3, with the minor axes of the oblong openings lying along the line Y—Y. Preferably the minor axis of each opening 45 is less than the diameter of the corresponding circular opening 40 previously used, and the major axis is greater, the two axes of each opening 45 being so related to the diameter of the corresponding circular opening 40 that the areas of the openings 45 are substantially the same as those of the corresponding circular openings 40. As a result of this proposed change in shape of air admission openings, conditions are improved in at least two respects.

Firstly, the strips 46 of material between adjacent openings 45 in each row are of increased width, providing correspondingly greater strength in the regions of greatest weakness.

Secondly, the openings in each row are separated by parallel-sided strips of material with the result that tendency of cracks to start along a straight line such as Y—Y is eliminated, as there is no point of minimum width of strip.

While the invention has been shown in but one form, it will be obvious to those skilled in the art that it is not so limited, but is susceptible of various changes and modifications without departing from the spirit thereof.

What is claimed is:

In combustion apparatus for an aircraft power plant, wall structure defining a combustion chamber subject to conditions of high temperature, said wall structure having longitudinally-extending rows of openings for admission of air to said chamber, said openings having straight sides normal to the longitudinal axis of their row connected by semi-circular ends, whereby the openings in a row are separated by parallel-sided strips of wall structure material.

FERDINAND P. BERGER.

REFERENCES CITED

The following references are of record in the file of this patent:

UNITED STATES PATENTS

| Number | Name | Date |
| --- | --- | --- |
| 365,632 | Read | June 28, 1887 |
| 1,411,749 | Schulenberg | Apr. 4, 1922 |
| 1,417,819 | Fuetter | May 30, 1922 |
| 1,817,470 | Adams | Aug. 4, 1931 |

FOREIGN PATENTS

| Number | Country | Date |
| --- | --- | --- |
| 259,044 | Great Britain | Oct. 7, 1926 |